United States Patent [19]

Danzer et al.

[11] 3,932,691

[45] Jan. 13, 1976

[54] METHOD OF INSULATING ROTOR PLATES

[75] Inventors: Joseph Danzer; Helmut Weber, both of Munich, Germany

[73] Assignee: Wacker-Chemie GmbH, Munich, Germany

[22] Filed: Oct. 5, 1973

[21] Appl. No.: 403,754

Related U.S. Application Data

[63] Continuation-in-part of Ser. No. 118,984, Feb. 25, 1971, abandoned.

[30] Foreign Application Priority Data

Mar. 3, 1970 Germany.............................. 2009906

[52] U.S. Cl. ............... 428/450; 427/116; 427/226; 427/377; 428/469
[51] Int. Cl.² ...................... B32B 15/04; B05D 3/04
[58] Field of Search ............. 117/132 BS, 62, 119.8, 117/169 A, 135.1, 232; 148/6.35; 427/377, 116, 226; 428/450, 469

[56] References Cited
UNITED STATES PATENTS

| | | | |
|---|---|---|---|
| 2,282,163 | 5/1942 | Burgwin | 148/6.35 |
| 2,842,521 | 7/1958 | Nitzsche et al. | 117/161 ZA |
| 2,978,361 | 4/1961 | Seidl | 117/169 A |
| 3,307,981 | 3/1967 | Katsahnias | 148/6.35 |
| 3,470,010 | 9/1969 | Christiansen | 117/18 |
| 3,537,915 | 11/1970 | Becker | 148/6.35 |
| 3,556,871 | 1/1971 | Helgert et al. | 117/6.35 X |
| 3,681,113 | 8/1972 | Yoldas | 117/169 A |

FOREIGN PATENTS OR APPLICATIONS

| | | | |
|---|---|---|---|
| 45-31727 | 4/1967 | Japan | 117/135.1 |

*Primary Examiner*—Harry J. Gwinnell

[57] ABSTRACT

The invention relates to a method for insulating rotor plates for electric motors by coating the rotor plates with a solution containing organo-silicon compounds, drying the coated plates and thereafter contacting the coated plates with a steam atmosphere to form a blue iron-oxide film thereon.

11 Claims, No Drawings

METHOD OF INSULATING ROTOR PLATES

This application is a continuation-in-part of applicant's copending application Ser. No. 118,984, filed Feb. 25, 1971 and now abandoned.

The invention relates to insulated rotor plates for electric motors, and more particularly to a method of insulating iron rotors in which the electric conductor consists of bare, (i.e., not provided with insulation) aluminum.

Many of the rotors used heretofore in electric motors contain a wire coil conductor. However, in order to reduce the cost of manufacturing, wire coil conductors are no longer used in rotors for electric motors, particularly in household appliances. Instead, the manufacturers press melted aluminum into the grooves between the iron rotor plates, which after solidification, serves as a conductor in place of the formerly used wire coil.

Since it is essential for the operation of the motor that the rotor plates be insulated from each other, and from the electric conductor adjacent to the rotor plates, the decarbonized and degreased plates have been steam treated to form a blue iron-oxide film thereon to provide insulation between the rotor plates and the electric conductor. Insulation thus obtained in this manner is extremely unsatisfactory. One of the disadvantages is the power loss which occurs in the finished motor. Although motor manufacturers have attempted to compensate for this disadvantage by over-dimensioning the motor, this has resulted in a rejection of at least 15 percent of the rotors.

Thus, it can readily be seen, that there is a definite need for improving the insulation of the rotor plates in order to overcome the power loss factor which is prevalent in motors insulated with a blue iron-oxide film.

Therefore, it is an object of this invention to provide insulated rotor plates for electric motors. Another object of this invention is to provide a method for insulating rotor plates for electric motors. A further object of this invention is to provide electric motors with a lower power loss and which are substantially more efficient.

These and other objects are accomplished in accordance with this invention, generally speaking, by applying a solution containing organosilicon compounds to a previously decarbonized and degreased rotor plate and thereafter heating the coated rotor plate in a steam atmosphere at a temperature of from about 350°C. to about 950°C. to convert the organosilicon compounds to silica and to form a blue iron-oxide film thereon.

The rotor plates are first punched out and degreased by any conventional technique known in the art for degreasing metal objects. Especially good results have been achieved by dipping, or spraying the plates with volatile organic solvents, such as halogenated hydrocarbons, e.g., trichloroethylene, carbon tetrachloride, and aromatic hydrocarbons such as toluene and xylene. The degreased rotor plates are then coated with the organosilicon compositions of this invention and thereafter contacted with steam.

Organosilicon compositions which may be used in this invention are the organopolysiloxane resins which contain polymeric units of the formula:

where R is an organic group linked to a silicon atom such as alkyl groups, e.g., methyl, ethyl, propyl, butyl, octadecyl, etc. Other organic groups which may be linked to the silicon atom are monocyclic groups such as phenyl. In the units themselves, $n$ can be 0 to 3 and the average value of $n$ for all the units present is usually from 0.9 to 2.0 and more preferably from about 1.0 to 1.9. If the ratio of organic groups to silicon is less than 0.9, the formation of a solution in an organic solvent is extremely difficult, whereas, if the ratio is higher than 1.9, the organopolysiloxanes are too volatile and difficult to prepare.

Monomeric organosilicon compounds such as alkyltrialkoxy silanes, and tetraalkylsilicates may also be used in this invention. The presence of condensation catalysts should be avoided, if possible, since these may cause premature gelling of the composition.

The organopolysiloxane resins used in this invention usually have some alkoxy groups connected to the silicon atoms. Although the amount of alkoxy groups is not critical, an amount of from about 0.5 to about 10 mol percent based on the silicon present is preferred. Also mixtures of alkoxy containing organopolysiloxane resins and tetraalkyl silicates having from 0.5 to about 10 mol percent alkoxy groups based on the silicon may be employed in this invention.

Various methods for preparing these organopolysiloxane resins have been described in the literature. In general, an appropriate organohalosilane is reacted with an alcohol and the resulting ester is partially hydrolyzed. The nature of the alkoxy group is not critical to the invention, but for practical purposes the lower alkoxy radicals, e.g., 1 to 8 carbon atoms are preferred.

Excellent results have been achieved using organopolysiloxane resins, which have been produced by further condensing an alkylpolysiloxane resin (in particular a methyl polysiloxane resin) containing partially-condensed alkoxy groups (e.g., ethoxy groups), at an elevated temperature in the presence of a boric acid complex such as described in U.S. Pat. No. 2,842,521 to Nitzsche et al.

The boric acid complexes are prepared by reacting boric acid with water, with liquid mono- or polyhydric alcohols, or with phenols. The reaction to form these complexes is usually brought about by merely mixing the reactants to form a paste thereof. The amounts of boric acid and hydroxy compound employed to form the complex are not critical, for an excess of either ingredient does no particular harm to the resin mixture.

There is no limit on the molecular weight of the alcohols or phenols employed to form the complex, except that they should be liquid at ordinary temperatures. Suitable compounds are aliphatic monohydric and polyhydric alcohols, e.g., methanol, ethanol, propanol, butanol, glycerine, ethylene glycol, propylene glycol, and aromatic alcohols, e.g., phenol, o-, m- and p-cresol, etc. The lower boiling hydroxy compounds are preferred, because they are more readily volatilized from the resin during its cure.

It is preferred that the organic solvents used in preparing the solutions containing the organosilicon compounds of this invention have boiling points between about 100°C. and about 250°C. Examples of suitable solvents are hydrocarbons such as alkanes having boiling points in the range of from about 120°C. to about 180°C.; aromatic hydrocarbons such as, toluene and xylene; chlorinated hydrocarbons such as trichloroethylene; alcohols such as isopropyl alcohol; ketones such as acetone and methyl ethyl ketone; esters such as ethyl acetate and mixtures thereof.

Although the amount of organosilicon compounds to the total weight of the solution is not critical, they should preferably be in the range of from about 5 to 30 and more preferably from about 10 to 20 percent by weight based on the total weight of the composition.

If desired, silica having a surface area of more than 50 m²/g, such as fumed silica may be incorporated in the coating compositions of this invention. The amount of silica, preferably should not exceed about 100 percent by weight of the other silicon compounds.

In order to avoid complications such as the formation of vapors which may be injurious to personnel, these solutions should contain only the essential constitutents such as the organosilicon compounds, the organic solvent, and if desired, silica.

The solutions of this invention may be applied on the rotor plates by any technique known in the art such as by dipping, spraying or brushing.

Preferably, the silicon compounds should be applied on the plates in such a quantity that the plates have a coating thickness of from about 8 to 10 microns after drying and before steam-treatment.

Drying of the coated plates may be effected at room temperature or if desired, the drying step may be accelerated by placing them in an oven at a slightly elevated temperature, up to about 80°C. The plates should then be heated for ½ to 1 hour at a temperature of from about 150° to 220°C.

The plates are then subjected to an atmosphere of steam in a furnace, into which water or steam is introduced at a temperature of from about 350° to about 950°C., preferably from about 700° to 800°C. until a blue iron-oxide film forms thereon. The rotor plates after steam treatment contain an insulation layer of silica and blue iron-oxide film of from about 1 to 2 microns in thickness.

The coatings produced with the newly-developed method described above exhibit excellent adhesion, are scratch-resistant and possess a high Ohm-resistance. Where the organopolysiloxanes are applied only after the plates have been coated with the blue iron-oxide film, the desired degree of success will not be achieved. Thus, it is apparent that an interaction occurs during the conversion of the organosilicon compounds to silica and the formation of the blue iron-oxide film thereon.

Various embodiments of this invention are illustrated in the following example in which all parts are by weight unless otherwise specified.

EXAMPLE 1

An organopolysiloxane resin is prepared by adding a mixture containing 90 parts of methyltrichlorosilane and 15 parts of dimethyldichlorosilane dropwise to about 70 parts of ethanol with agitation. The resulting mixture is combined with 15 parts of water, and after 10 minutes, the mixture is mixed with 100 parts of toluene and 200 parts of water. The hydrochloric acid thus evolved is removed by washing and the toluene distilled off. The partially condensed methylpolysiloxanes remaining after the distillation is then combined with a mixture containing 0.5 part of boric acid and 0.5 part of glycerin, and heated up to a temperature of about 150°C. with continuous agitation until a viscosity of about 60,000 cs. at 25°C. is achieved.

Rotor plates are punched out of a 0.6 mm thick sheet of iron in the normal rotor configuration and decarbonized. The plates are degreased by dipping in trichloroethylene and then dipped in an acetone solution containing 20 percent by weight of the organopolysiloxane resin prepared above. About 9.68 parts of resin for every m² are deposited on the plates. These plates are air-dried overnight at room temperature, after which the coating is from about 8 to 10 microns in thickness and then heated for ½ hour at 200°C. The plates are then heated in a furnace at about 800°C. in the presence of steam until a blue iron-oxide film forms. The resulting coating which measures about 1.5 microns in thickness exhibits excellent adhesion, is scratch resistant and possesses high Ohm-resistance.

Although a specific example of the invention has been described herein, it is not intended to limit the invention solely thereto, but to include all the variations and modifications falling within the spirit and scope of the appended claims.

What is claimed is:

1. An improved method for insulating iron rotor plates for an electric motor in which the electric conductor consists of bare aluminum by contacting decarbonized and degreased rotor plates with steam at a temperature of from 350° to about 950°C. until a blue iron-oxide film is formed, the improvement which comprises coating said plates with a composition containing an organosilicon material and an organic solvent and thereafter drying the coated plates before contacting the plates with steam.

2. The improved method of claim 1 wherein the organosilicon material is an organopolysiloxane resin having a ratio of silicon-bonded organic groups to silicon atoms of from 0.9 to 1.9.

3. The improved method of claim 1 wherein the organic solvent has a boiling range of from about 100° to about 250°C.

4. The improved method of claim 2 wherein the organopolysiloxane resin is obtained from the condensation of a partially condensed alkoxypolysiloxane resin in the presence of a complex containing boric acid and a hydroxyl containing compound.

5. The improved method of claim 4 wherein the hydroxyl containing compound is selected from the group consisting of water, liquid monohydric alcohols, liquid polyhydric alcohols and phenols.

6. The improved method of claim 1 wherein the composition is applied to the plates in such an amount that the plates have a coating of from 8 to 10 microns in thickness after drying.

7. The improved method of claim 1 wherein the organosilicon material is a mixture consisting essentially of a tetraalkyl silicate and an alkoxy organopolysiloxane resin having from 0.5 to about 10 mol percent alkoxy groups based on the silicon.

8. The improved method of claim 1 wherein the composition contains silica having a surface area of more than 50 m²/g.

9. The improved method of claim 1 wherein the organosilicon material is present in the composition in an amount of from 5 to 30 percent by weight based on the weight of the composition.

10. An insulated iron rotor plate for an electric motor having a blue iron-oxide-silica film thereon in which the electric conductor consists of bare aluminum, said insulated rotor plate is obtained by coating said rotor plate with a solution consisting of an organosilicon material and a solvent for said organosilicon material and thereafter treating said coated plate with steam at a temperature of from 350° to 950°C. until a layer of blue iron-oxide film and silica is formed thereon.

11. The insulated iron rotor plate of claim 10 wherein the blue iron-oxide and silica layer is from 1 to 2 microns in thickness.

* * * * *